July 7, 1970  T. K. HUTCHINSON  3,518,966
GLUING MACHINE WITH PROTECTED ADVANCING MECHANISM
Filed March 6, 1968  4 Sheets-Sheet 2
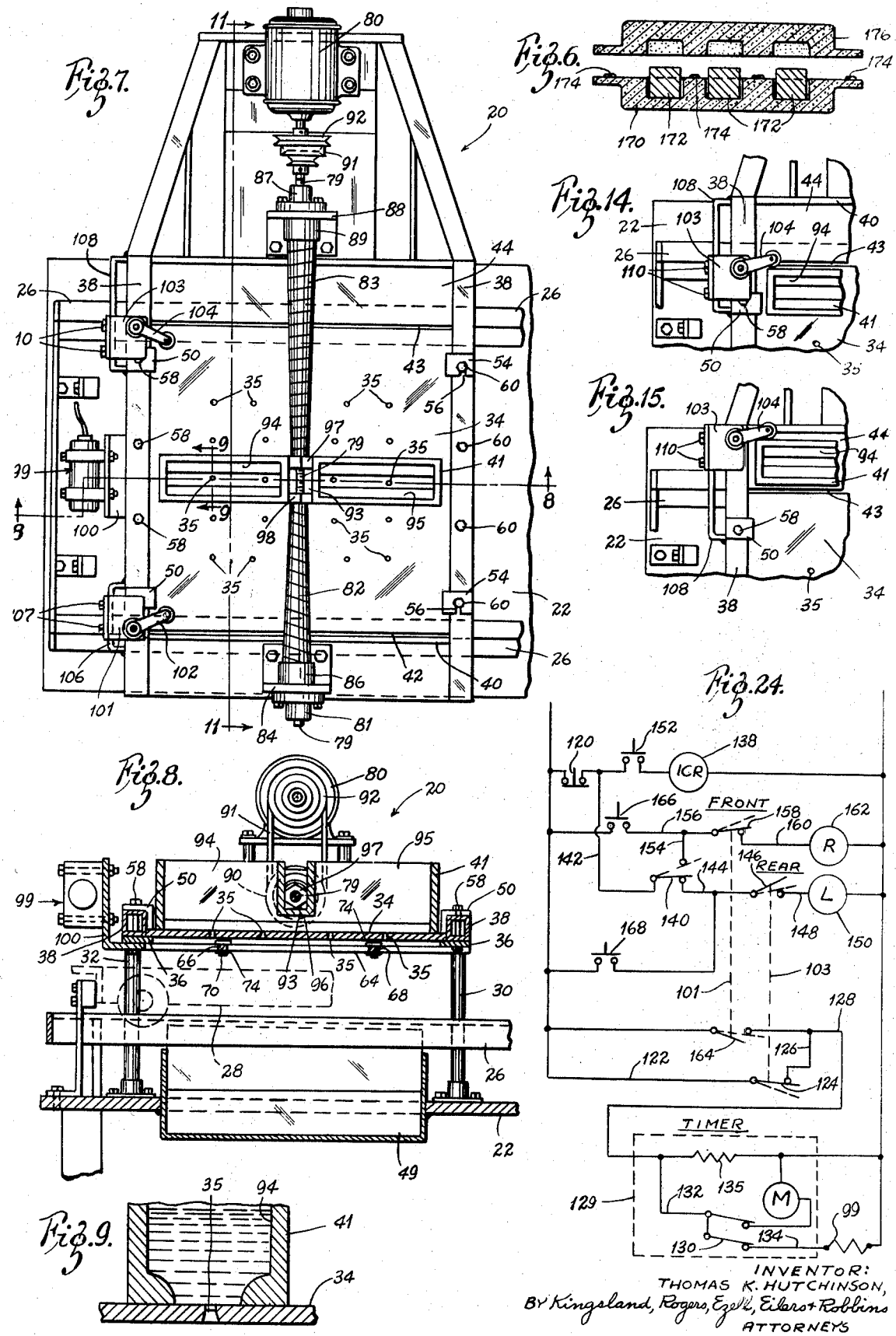

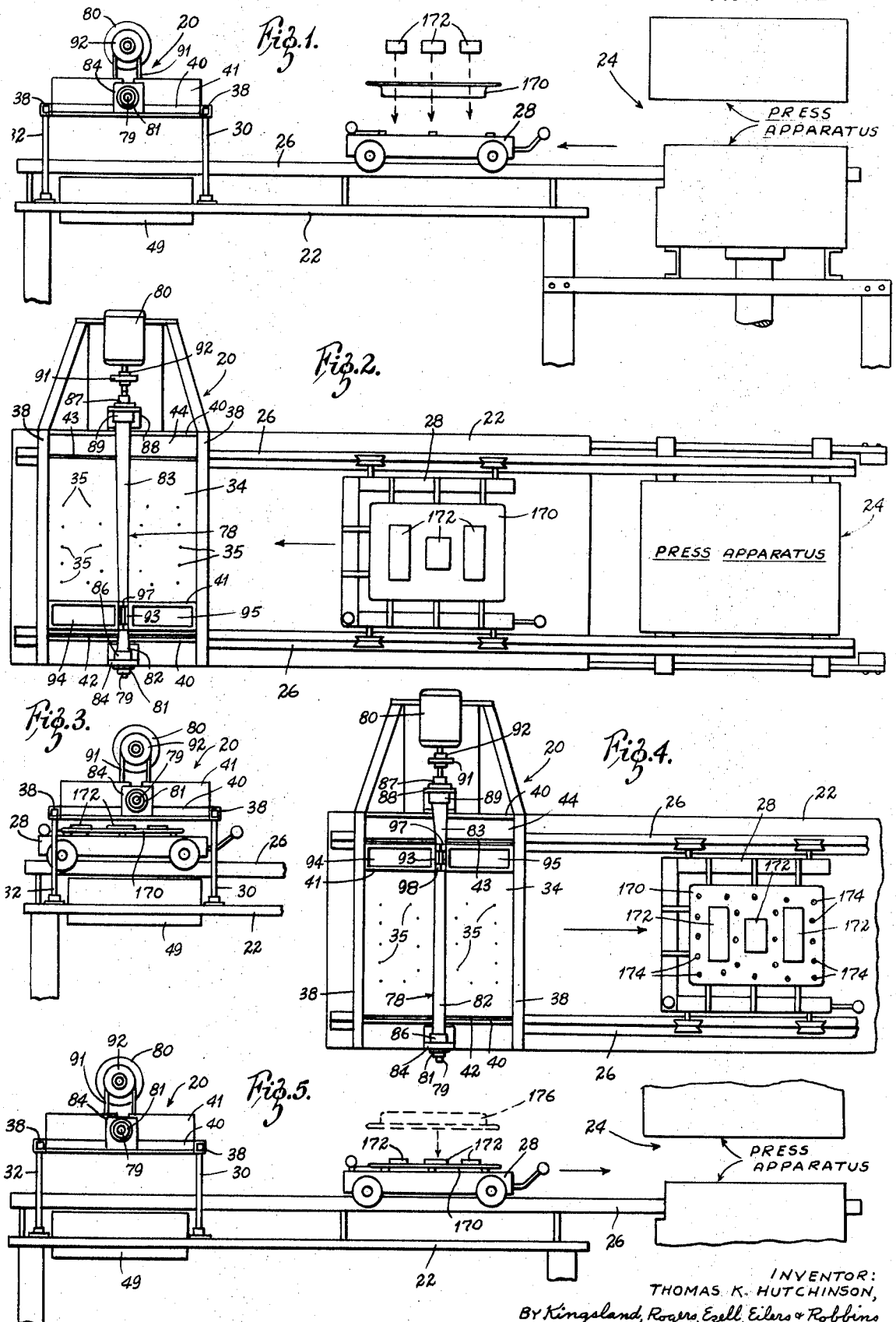

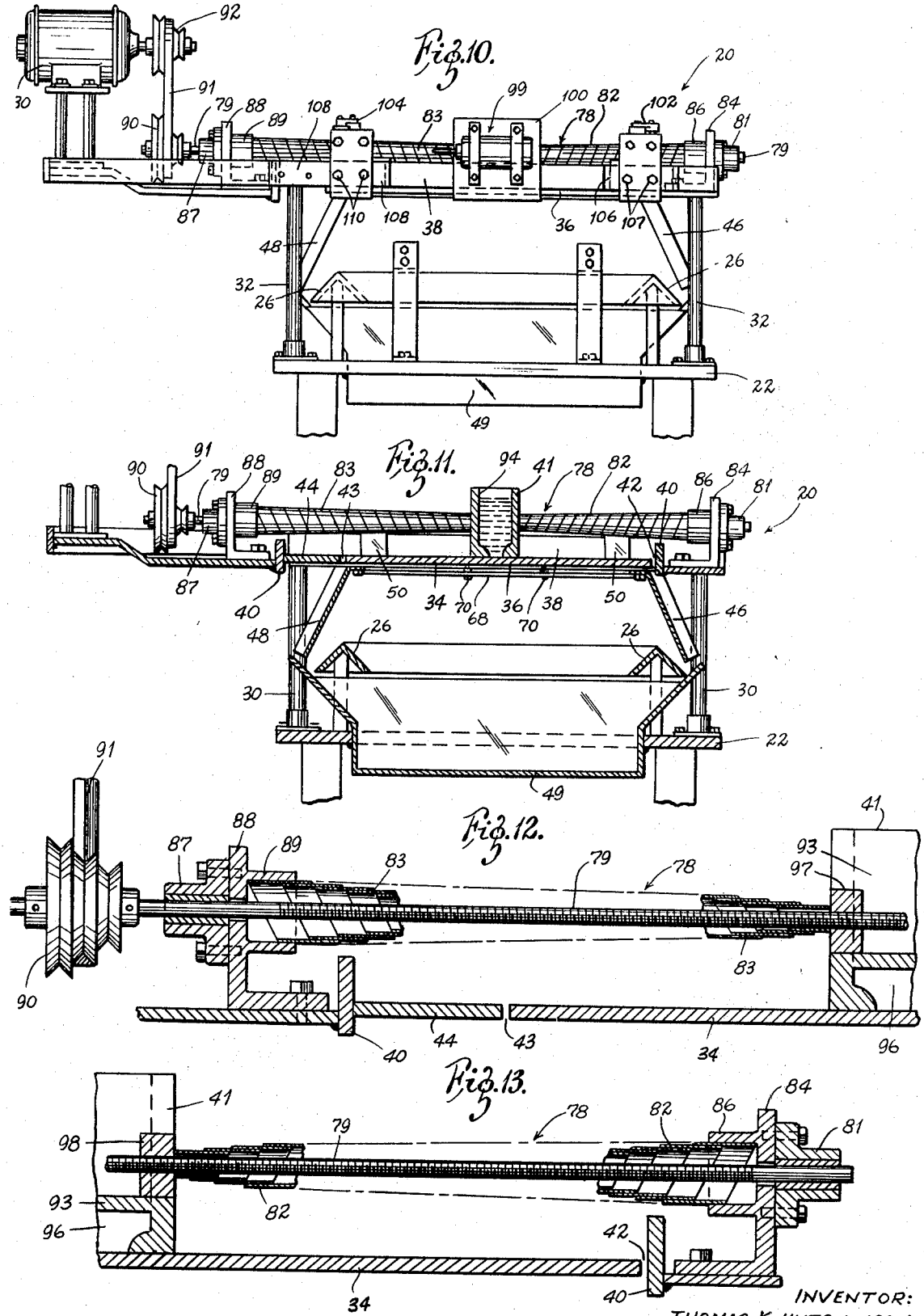

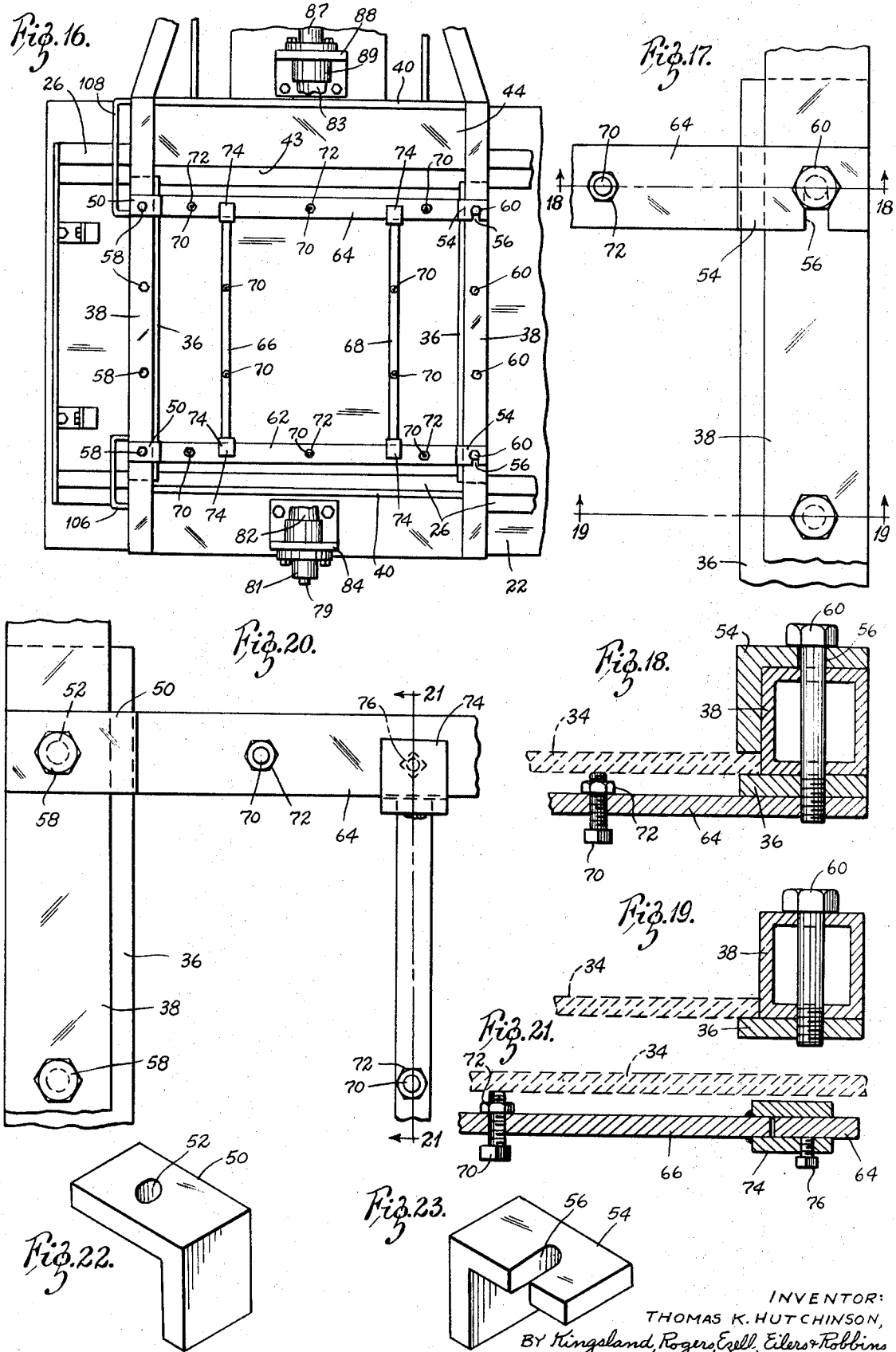

United States Patent Office 3,518,966
Patented July 7, 1970

---

3,518,966
GLUING MACHINE WITH PROTECTED
ADVANCING MECHANISM
Thomas K. Hutchinson, 4649 Levis Lane,
Godfrey, Ill. 62035
Filed Mar. 6, 1968, Ser. No. 711,068
Int. Cl. B05c 5/00
U.S. Cl. 118—301                    12 Claims

ABSTRACT OF THE DISCLOSURE

A gluing machine for dispensing droplets of glue through a pattern provided with glue holes in which a glue trough is advanced and retracted by a protected lead screw mechanism. The lead screw is connected at one end to the gluing machine frame and through the gluing trough and to a motor at the other end to provide a positive smooth operation free from jerking movement. Protection is afforded by a telescopic spring sleeve surrounding the lead screw such that the screw shaft is never exposed to contamination by glue or other foreign matter. The pattern plate is provided with specially designed support means to prevent warping and to effect rapid changeover of pattern plates for new job set ups. The gluing machine is especially adapted for dispensing glue to shell molds.

Summary of the invention

In the manufacture of shell molds, droplets of liquid glue are applied to the drag section of a mold, followed by the positioning of the cope section in proper relation to the drag portion of the mold, and subsequently placing the assembled mold in a press to clamp the mold together for a sufficient period of time to allow bonding. The gluing machine to which this invention is directed employs an open top glue container or trough, which is wiped across a glue pattern plate provided with holes corresponding to the area and design in which the droplets of glue are to fall and be dispensed on the top surface of the drag section of the mold when placed underneath the pattern plate. Problems have arisen in the past with respect to the proper advancing and return movement of the glue container, which must be accurately and smoothly controlled to provide for proper operation. Improper application of the glue and faulty dispensing can ruin a mold and cause complete rejects of all cast articles with obvious disastrous consequences. Thus, in large machines where pneumatic air cylinders have been used, the long piston and stroke necessitated has led to bulky and cumbersome equipment and difficulty in control of a smooth stroke, including a tendency to skew. Hydraulic cylinders require special valving and present the problem of leakage. The motor driven lead screw drive means of this invention obviates these problems.

It is a principle feature of this invention that the glue container is advanced and returned across the pattern plate by means of a lead screw mechanism. The lead screw is connected at one end to the frame of the gluing machine through threaded bearings in the glue container and at the other end to a reversing motor, such that operation of the motor causes the glue container to advance or return across the pattern plate and dispense glue through the openings therein. A protective telescopic spring sleeve is employed, which is concentric with and completely surrounds the lead screw. In this manner the lead screw is protected from glue or other foreign objects, which would impair the advancing and return of the glue container. The protective spring sleeve insures, accordingly, the proper operation of the lead screw and smooth and efficient advancing and return of the glue container when the motor is operated.

The pattern plate is further provided with support means comprising adjustable vertically extending support means which bear underneath the plate. These supports are adjustable to prevent warping of the plate and may be evenly distributed to provide an even load distribution. The plate is simply removable by clamps on plate supporting rail members to effect rapid plate changes for new job set-ups.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of illustration only and that the invention is not limited thereto.

In the drawings:

FIG. 1 is a generally diagrammatic view in front elevation of the gluing machine used with a mold carriage and a mold press apparatus;

FIG. 2 is a top plan view of the gluing machine assembly of FIG. 1;

FIG. 3 is a fragmentary view in front elevation of the left hand portion of the gluing machine with the mold carriage inserted therein;

FIG. 4 is a top plan view of the gluing machine and central portion of the carriage rail section showing the gluing machine removed after gluing of the mold;

FIG. 5 is a view similar to FIG. 1 but showing a later stage of the operation after the bottom half of the mold has been glued with the top half of the mold about to be placed thereupon;

FIG. 6 is a view in vertical section of the bottom half of the mold with glue droplets placed thereon and the top half of the mold about to be applied;

FIG. 7 is a top plan view of the gluing machine of this invention;

FIG. 8 is a view in section taken on the line 8—8 of FIG. 7 showing the connection of the gluing trough and its support with respect to the machine;

FIG. 9 is an enlarged view in section on the line 9—9 of FIG. 7 showing the relationhsip of the gluing trough with respect to the gluing plate;

FIG. 10 is a view in elevation taken from the left side of the gluing machine;

FIG. 11 is a view in section taken on the line 11—11 of FIG. 7;

FIG. 12 is an enlarged view in vertical section taken through the center of the rear protective telescopic spring sleeve showing its mounting around the reversing shaft for the gluing trough;

FIG. 13 is an enlarged view in vertical section taken similarly to FIG. 12 but showing the front portion of the protective telescopic spring sleeve and its mounting;

FIG. 14 is a fragmentary plan view of the upper left hand corner of FIG. 7 showing the movement of the rear limit switch when contacted by the gluing trough in the rearward position;

FIG. 15 is a view similar to FIG. 14 but showing an adjustment of the rear limit switch upon its support to provide a greater rearward travel for the trough upon the gluing plate;

FIG. 16 is a fragmentary view similar to FIG. 7 with the switches, vibrator, glue pot and pattern plate omitted and the protected screw mechanism broken away, to show the supporting means for pattern plate;

FIG. 17 is an enlarged fragmentary view of the upper right hand corner of FIG. 16;

FIG. 18 is a view section taken on the line 18—18 of FIG. 17;

FIG. 19 is a view in section taken on the line 19—19 of FIG. 17;

FIG. 20 is an enlarged fragmentary plan view of the upper left hand corner of FIG. 16;

FIG. 21 is a view in section taken on the line 21—21 of FIG. 20;

FIG. 22 is a pictorial view of the left hand pattern plate clamp;

FIG. 23 is a pictorial view of the right hand pattern plate clamp; and

FIG. 24 is an electrical diagram showing the connections for the electrical components of the machine.

Description of the invention

In the drawings, FIG. 1 shows the gluing apparatus of this invention, generally identified by the reference numeral 20, positioned at the left side of a work table 22. A press apparatus, designated by the reference numeral 24, is situated at the right side of the work area. A pair of carriage rails 26 extends between the gluing apparatus and the press apparatus and receives the carriage 28, which is fashioned to support a shell mold which is to be glued and then pressed in the apapratus.

The gluing apparatus is comprised of front vertical suports 30, which are bolted to the work table and rear vertical supports 32, likewise bolted to the work table. A perforated gluing plate 34 having holes 35 is best shown in FIG. 8. Frame members 36, best shown in FIG. 8, support the sides of the glue pattern plate, and in turn are bolted upon horizontally etxending support rails 38. Frame guard rails 40 at the front and rear of the glue plate define with the side frame members 36 and support rails 38 a reservoir or controlled area for the dispensing of glue upon and through the plate through a glue container 41. A spaced slot 42 is provided at the front of the gluing plate in advance of the front rail 40, and likewise a slot 43 is provided at the rear of the gluing plate, bordered by an extension plate 44, connected to the rear rail. The extension plate provides a rest area for the glue container when the glue container is moved off the rear of the pattern plate when the pattern plate is to be changed. Underlying the slots 42 and 43 are baffles 46 and 48, which are directed into a collecting trough 49 to collect excess glue. The baffles 46 and 48 direct droplets of glue away from the rails 26, as shown in FIG. 11, in order that the rails not be contaminated by droplets of glue.

The quick changeover and pattern plate support means to prevent warping is best shown in FIGS. 16-23. As a there shown, the support for the pattern plate at the left hand side of the machine is shown in FIG. 16 as provided through a left hand support clamp 50. This clamp is in the form of an angle iron, as shown in FIG. 22, having a bolt opening 52. Likewise, the support clamp for the right hand portion of the pattern plate is best shown in FIGS. 17 and 23. Thus, a right hand clamp 54 is provided having a slotted bolt opening 56. The left hand clamp 50 fits over the left hand rail 38 and bears against the top of the pattern plate when it is positioned upon the supporting frame member 36. Likewise, the right hand clamp 54 is positioned upon the right hand rail member 38 and bears against the top of the pattern plate holding it against the frame member 36 as shown in FIG. 18. The left hand clamp is tightened to the rail by a bolt 58 and likewise a similar bolt 60 is employed for the right hand clamp. The right hand clamp may be removed from the bolt 60 after it is loosened, such that upon loosening of the left hand clamp the plate can be withdrawn from supporting engagement by simply withdrawing it from the left hand side and removing it from the supporting frame members 36.

The warp preventing means is provided through two laterally extending braces 62 at the front of the equipment and 64 at the rear of the equipment, respectively. These braces in turn support adjustable longitudinally extending brace members 66 and 68. The brace members are individually provided with screws 70 and adjustment nuts 72 to bear against the underneath sides of the pattern plate. The provision of the various adjustment screws 70 in bearing contact with the underneath side of the pattern plate prevents warping by multiple and evenly distributed bearing contact distributed over the bottom of the pattern plate, which it is to be noted provides no interference with the glue openings. Thus, the longitudinal braces 68, by means of bifurcated supported brackets 74 supporting the longitudinal braces upon the lateral braces, are adjustable either to the left or the right from the positions shown in FIG. 16 in order that the braces may be moved out of interferring position with glue openings that might be effected through the use of different types of pattern plates. An adjustment screw 76 is provided for the bracket or clamp 74 once the proper adjustment of the longitudinal braces 66 and 68 is effected, as shown in FIG. 21.

The advancing means for the glue container is generally indicated by the reference numeral 78, in, for examples, FIGS. 2, 7, 10 and 11. Its main elements are an elongated lead screw 79, which passes through the middle of the glue container and is driven by a motor 80 at one end with the opposite end being supported for free rotation through a journal 81 at the front of the table. Protective telescopic spring sleeves 82 and 83 protect the front and the rear portions of the lead screw from contamination by glue or other foreign material to insure free operation.

The lead screw 79 is journalled for free rotation at the front of the gluing machine in journal 81, which is mounted upon a bracket 84, fixed to the front of the table. The bracket 84 in turn is provided with a cup-shaped sleeve 86 which anchors the enlarged end of the protective telescopic spring sleeve 82, as best shown in FIG. 13.

The lead screw at its rear end is journalled within the journal 87, as shown in FIG. 12, which is connected to a bracket 88, affixed to the rear end of the table. The bracket 88 likewise is provided with a cup-shaped sleeve 89, which anchors the enlarged end of the rear protective telescopic spring sleeve 83. The sleeve and bracket 88 are both provided with openings to receive the extended lead screw for drive connection.

Driving of the lead screw 79 is effected by means of a pulley block 90 as shown in FIG. 12 affixed to the extended rear end of the lead screw. This pulley block is powered by means of a pulley belt 91 fitting over drive pulley wheel 92 connected to the motor 80, as shown in FIG. 10.

The lead screw 79 fits through the glue container 41 in threaded relationship in order that the rotary movement of the lead screw can advance or return the gluing container across the gluing plate depending upon the direction of rotation of the lead screw as effected by the forward or reversing movement of the motor 80. This relationship is best shown in FIGS. 8, 12 and 13. Thus, the lead screw passes through a protective well or opening 93 in the center of the gluing container 41. This well is spaced above the bottom of the gluing container such that communication of the glue from section 94 to 95 can be effected in the space 96 underneath the well, as shown in FIG. 8. The threaded relationship is effected by means of threaded bosses 97 at the rear of the gluing container and 98 at the front of the gluing container shown in FIGS. 12 and 13, respectively. These bosses fit within the well and may take the form of simple hexagonal nuts which are mounted in fixed relationship within the well.

A vibrator 99 is used to vibrate the gluing apparatus to insure that droplets of glue are dispensed through the gluing plate 34. The vibrator is best shown in FIGS. 7 and 8. It is mounted upon an angle iron 100, which in turn is connected to support rail 38 at the left side of the gluing apparatus. It is controlled by a front normally open double pole limit switch 101 having a contact arm 102 actuated by contact with the gluing container when it reaches the limit of movement to the front. Likewise, a rear, normally open, double pole limit switch 103 is provided having a contact arm 104 actuated in like manner on the reverse movement of the gluing container to the rear of the gluing plate. The front limit switch 101 is mounted for adjustable movement upon a bracket 106 by means of adjustment bolts 107. In this fashion the switch may be adjusted in its limiting position as desired. Likewise, the rear limit switch is mounted upon a bracket or rail 108 with adjustment being provided by the bolts 110 to effect positions of varied adjustment of the rear limiting switch. When the rear limit switch is moved to the rear adjustment position the glue container can be moved off the pattern plate to the rear over the extension plate 44. This clears the pattern plate permitting its removal and replacmeent with a new plate in a rapid changeover or new job set-up.

A schematic diagram of the gluing machine electrical control is shown in FIG. 24. A main selector switch 120 is employed as a safety stop. It is not employed in normal operation. The circuit will be described first when the glue container is in the rear position holding the rear limit switch 103 in closed position to establish a circuit through line 122, contact 124 of the rear limit switch, line 126–128 to the timer 129. The circuit through the timer controlled by a synchronous motor is by contact 130 connecting leads 132 and 134 to the vibrator 99. A clutch coil 135 completes the timer circuit. After the timer "times-out" to open contact 130, the vibrator circuit is opened.

The sequence relay 138 is in a position which energizes contact 140 which through leads 142 and 144, switch 146 and lead 148 would complete a circuit to a motor "go-left" winding 150. However, the glue container is in the rear position and holds the rear limit switch 103 open so that contact 146 is open. Thus, the motor circuits are open.

To start the cycle a start button 152 is pressed. This energizes the sequence relay 138 which moves the contact 140 to the dotted lines position to establish a circuit through lines 154–156, contact 158 of the front limit switch 101 and lead 160 to the motor "go-right" winding 162. The glue container now travels from rear to front where it engages the front limit switch 101. This causes the motor circuit to open as contact 158 is opened and closes a circuit through contact 164 to energize the timer 129 and the vibrator 99. The vibrator stops when the timer "times-out."

To start the front to rear movement cycle of the glue container the start button 152 is again pressed energizing the sequence relay. This closes contact 140 to lines 144 and 146, contact 146 of the rear limit switch 103 to the "go-left" motor winding 150. The glue container moves from front to rear. Subsequent cycles are repeated in the same sequence as described.

Switch buttons 166 and 168 are provided to establish direct circuits to the "go-right" motor winding 162 and the "go-left" motor winding, respectively. They are employed only for setup purposes.

Operation

In the operation of this invention the drag or lower portion 170 of the shell mold, as shown in FIG. 1, is first placed upon the carriage 28 with shell cores 172 of one type or another positioned in the usual fashion. The carriage is then wheeled underneath the gluing apparatus 20 in the direction of the arrow shown in FIG. 2 to a registry position underneath the gluing plate as shown in FIG. 3. (See also FIG. 8—bumpers position carriage.) The gluing plate 34 is chosen so that its perforated holes 35 are in a proper pattern position to dispense glue droplets in a carefully selected fashion upon the drag portion of the mold. Various gluing plates with different glue hole arrangements may be used and different patterns of glue droplets may be chosen as will be well understood in the art.

With the drag portion of the mold in proper registry, the gluing operation is commenced by operation of the selector and start switches 120 and 152. Then, depending upon the position of the gluing trough as to whether it is the front or the rear, either the go-right or go-left switches 166 and 168 are operated to move the glue container or trough across the gluing plate. Thus, the motor 80 will cause the rotation of the lead screw 78 to cause the movement of the gluing container either from front to rear or from rear to front of the gluing pattern plate, depending upon the starting position. As the gluing container moves over the gluing plate, glue fills the opening in the pattern plate. At the completion of the pass of the glue container, either the front or the rear limit switch is contacted by the glue container to cause operation of the vibrator 99. The vibrator movement of the vibrator causes the gluing plate to vibrate and release the droplets of glue 174 in the gluing plate to fall through the glue openings into the desired position upon the top surface of the drag portion of the mold.

After the glue droplets are dispensed upon the completion of the aforementioned cycle, the carriage is moved with the drag section to the middle portion of the table as shown in FIG. 5. The top or cope portion 176 of the mold shown in dotted lines is then placed upon the bottom drag portion and the assembled mold is rolled into the press apparatus 24. The two halves of the mold are then pressed or clamped together in conventional fashion and the operator can commence another gluing operation.

Through the aforementioned construction, the lead screw 79, by reversal of the motor, causes the movement of the gluing container across the gluing plate, either from front to rear or reversely, depending upon the rotation of the motor as aforementioned. In this operation the rotary movement of the lead screw is fully protected by the protective telescopic spring sleeve, which either contracts or expands depending upon the movement of the gluing container. This function is best shown in FIGS. 2 and 10 through 13. In FIG. 2 the gluing container is shown at the very front of the gluing plate and the front protective telescopic spring sleeve is contracted to its completely contracted position, while the rear protected telescopic spring sleeve is fully expanded. FIGS. 10 through 13 show the gluing container when it is moved to the center of the gluing plate, and it is noted that both the front and the rear protective telescopic spring sleeves are in a medial position. Through the provision of these protective sleeves, full protection of the lead screw is provided for contamination by glue or other contaminants without impairing in any manner the operation of the screw. Thus, a positive and accurately controlled reversing motor with screw actuated means is made possible through this invention.

Various changes and modifications may be made within this invention as will be readily apparent to those skilled in the art. Such changes and modifications are within the scope and teaching of this invention as defined by the claims appended hereto.

What is claimed is:

1. A gluing device for dispensing droplets of liquid glue in a controlled pattern upon an article to be glued comprising a station receiving said article, a perforated glue pattern plate overlying said station in registry with said article, a glue container adapted to feed a controlled amount of glue to openings in said perforated plate, means for moving said glue container across the pattern plate, and dispense glue to the openings therein, said means comprising a lead screw operatively connected to said glue container, protective means enveloping the lead screw, and means for rotating said screw to effect movement of said glue container.

2. The gluing device of claim 1 in which there is provided protective means enveloping the lead screw, said protective means comprising a protective telescopic spring sleeve concentric with and surrounding the lead screw.

3. The gluing device of claim 2 in which the protective telescopic spring sleeve is fixed to the gluing machine at one end and to the glue container at its other end.

4. The gluing device of claim 1 in which switch means are provided responsive to contact by the glue container after it has moved across the pattern plate to a limiting position to actuate a vibrator connected to the pattern plate to vibrate the plate and shake droplets of glue in a controlled path upon the article to be glued, said switch means being adjustably mounted upon said machine to adjust said limiting position.

5. The gluing device of claim 1 in which there is provided protective means enveloping the lead screw, and said protective means comprises a pair of protective telescopic spring sleeves concentric with and surrounding the lead screw fixed at their ends to opposite sides of the glue container and extending to fixed bearing connections supporting the ends of the lead screw at the front and rear of the machine.

6. The gluing device of claim 1 in which the glue container has a protective wall extending from the front of the container to the rear receiving said lead screw, said wall being spaced above the bottom to provide a glue passage thereunder.

7. The gluing device of claim 1 in which the lead screw is threadably supported by said glue container and extends therethrough and in which there is provided protective means blocking the lead screw from the glue.

8. The gluing device of claim 1 in which the lead screw is threadably supported by said glue container and extends therethrough and in which there is provided protective sleeve means enveloping the lead screw, said sleeve being fixed to the gluing machine at one end and to the glue container at its opposite end and in which the glue container has an opening extending from the front of the container to the rear receiving said lead screw, said opening being spaced above the bottom to provide a glue passage thereunder.

9. The gluing device of claim 1 in which there is provided means for preventing warping of said pattern plate comprising vertically extending support elements bearing underneath said plate, said support elements being mounted on transverse members underneath said pattern plate and means for moving said mounting members from interfering registry with the glue openings in the pattern plate.

10. The gluing device of claim 1 in which there is provided means for preventing warping of said pattern plate comprising vertically extending support elements bearing underneath said plate, said support members being mounted on transverse members underneath said pattern plate, said transverse members having support means at their ends slidably mounted on a rail-like member whereby the transverse members may be moved from interfering registry with the glue openings in the pattern plate.

11. A gluing device for dispensing droplets of liquid glue in a controlled pattern upon an article to be glued comprising a station receiving said article, a perforated glue pattern plate overlying said station in registry with said article, a glue container adapted to feed a controlled amount of glue to openings in said perforated plate, means for moving said glue container across the pattern plate and dispense glue to the openings therein, and means for preventing warping of said pattern plate comprising vertically extending support elements bearing underneath said plate, said support elements being mounted on transverse members underneath said pattern plate and means for moving said mounting members from interfering registry with the glue openings in the pattern plate.

12. A gluing device for dispensing droplets of liquid glue in a controlled pattern upon an article to be glued comprising a station receiving said article, a perforated glue pattern plate overlying said station in registry with said article, a glue container adapted to feed a controlled amount of glue to openings in said perforated plate, means for moving said glue container across the pattern plate and dispense glue to the openings therein, and means for preventing warping of said pattern plate comprising vertically extending support elements bearing underneath said plate, said support members being mounted on transverse members underneath said pattern plate, said transverse members having support means at their ends slidably mounted on a rail-like member whereby the transverse members may be moved from interfering registry with the glue openings in the pattern plate.

References Cited

UNITED STATES PATENTS

| 2,637,269 | 5/1953 | Thomas | 101—123 |
| 2,793,586 | 5/1957 | Arelt | 101—123 |
| 2,961,946 | 11/1960 | Quist | 101—123 |

FOREIGN PATENTS 625,327   4/1927   France.

WALTER A. SCHEEL, Primary Examiner

J. P. McINTOSH, Assistant Examiner